Jan. 9, 1923. 1,441,595
C. MILLER.
POWER ATTACHMENT FOR AUTOMOBILES.
FILED MAR. 25, 1922. 2 SHEETS-SHEET 1
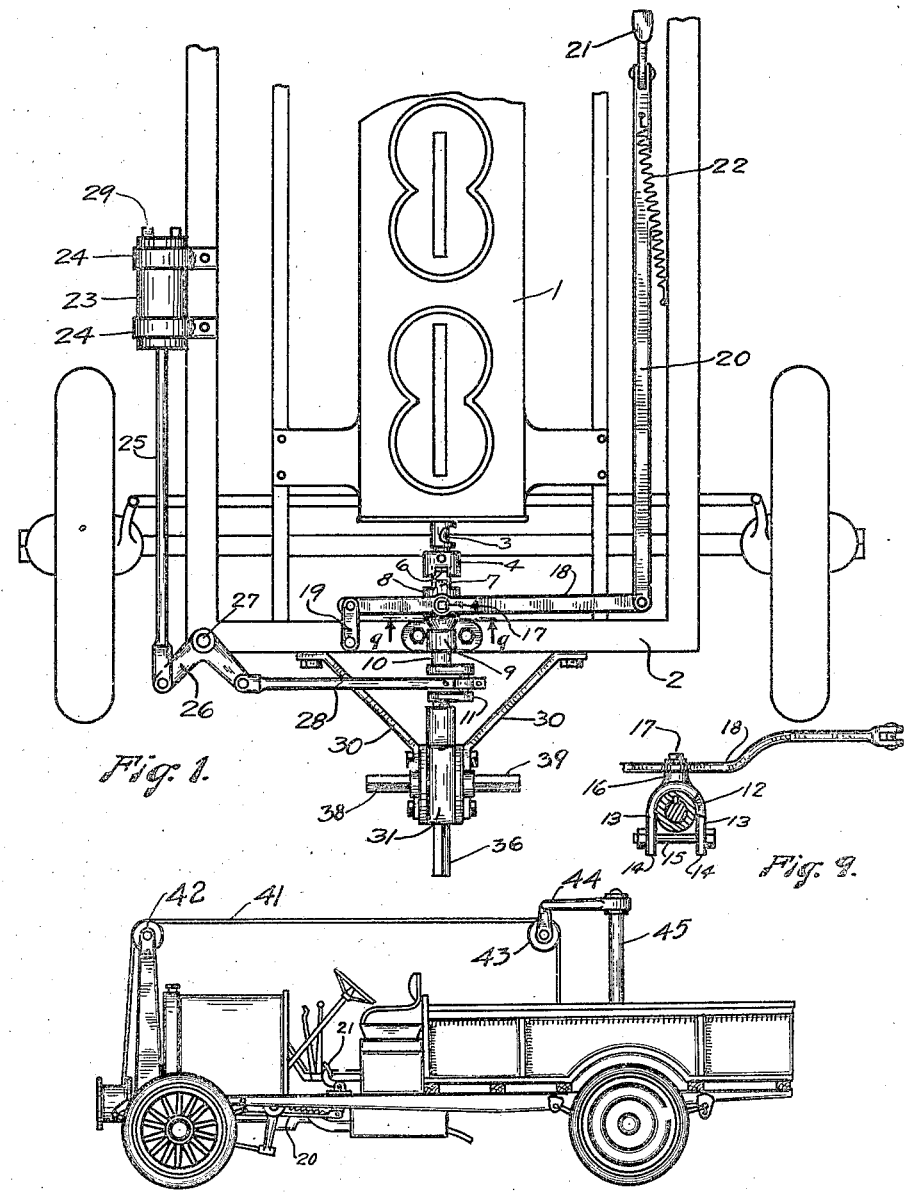
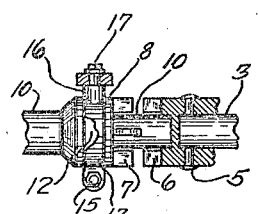

Jan. 9, 1923. 1,441,595
C. MILLER.
POWER ATTACHMENT FOR AUTOMOBILES.
FILED MAR. 25, 1922.
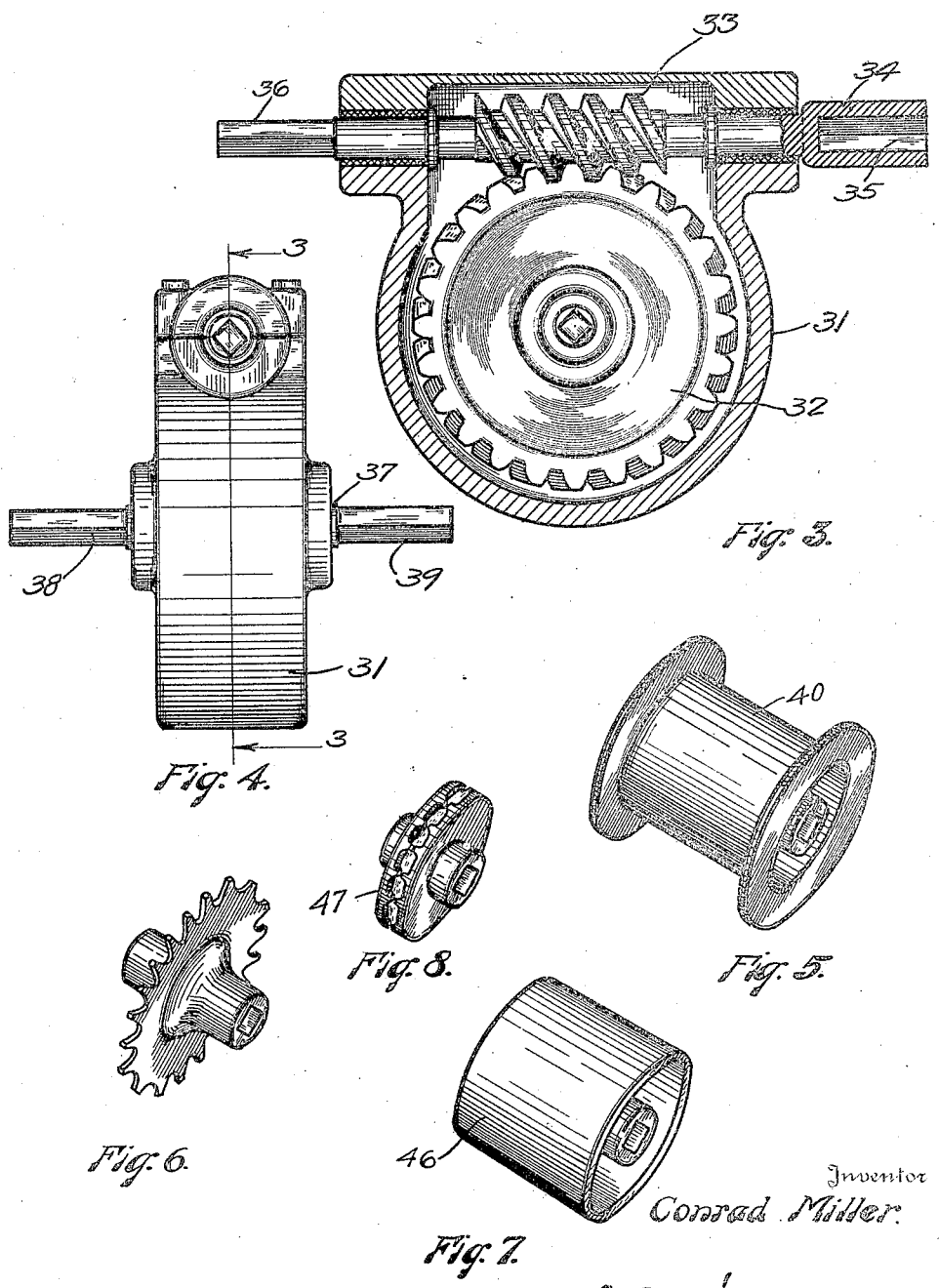

Patented Jan. 9, 1923.

1,441,595

UNITED STATES PATENT OFFICE.

CONRAD MILLER, OF CASPER, WYOMING.

POWER ATTACHMENT FOR AUTOMOBILES.

Application filed March 25, 1922. Serial No. 546,596.

*To all whom it may concern:*

Be it known that I, CONRAD MILLER, a citizen of the United States, residing at Casper, county of Natrona, and State of Wyoming, have invented certain new and useful Improvements in Power Attachments for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to an attachment that can be applied to the front of an automobile of ordinary construction, and which can be used for the purpose of delivering power to other machines or for hoisting.

It is the object of this invention to provide a device that can be cheaply made and easily installed on an automobile, and which will be so constructed that it can be used as a winch for loading and unloading, or for pulling the car out of a mud hole, and which can also be employed to deliver power to a belt-driven machine.

In order to more clearly describe my invention, I shall have reference to the accompanying drawing in which Fig. 1 shows a top plan view of the front end of an automobile equipped with my attachment;

Fig. 2 shows a side view of a truck equipped with my device;

Fig. 3 is a longitudinal section of the worm gear casing showing the gears therein;

Fig. 4 is a front elevation of the gear casing;

Fig. 5 is a drum adapted to accommodate a cable when my device is employed as a winch;

Fig. 6 is a sprocket wheel adapted to be employed in connection with my device;

Fig. 7 is a pulley that can be used when it is desired to operate belt-driven machinery;

Fig. 8 shows a pulley adapted for use with a chain cable;

Fig. 9 is a section taken on line 9—9, Fig. 1; and

Fig. 10 is a detail view of the clutch between the crank shaft 2 and the power shaft of my attachment.

The same reference numbers will be used to designate the same parts throughout the several views.

Numeral 1 represents the driving motor of an automobile or truck, and 2 represents the framework of the chassis. Secured to the end of crank shaft 3 is a coupling member 4 which is held thereon by a pin 5, or other suitable means. The front surface of member 4 is provided with a diametrical slot 6 which is adapted to cooperate with the projection 7 on the end of the slidable collar 8. Secured to the transverse bar 2 is a bearing 9, and rotatably mounted therein is a shaft 10 which is provided with a crank portion 11 on the outside of the frame 2, and a collar 8 slidably but non-rotatably mounted on the inner end thereof. Collar 8 has an annular groove intermediate its ends and straddling said member is a U-shaped yoke member 13 whose legs 14 engage in the slot 12 and have their ends held together by means of a bolt 15. The closed end of the U-shaped member 13 has an upwardly projecting part 16 which has secured thereto a bolt 17 which serves as a pivot pin for the operating lever 18, one end of which is pivotally connected to the frame 2 by means of a link 19. A rod 20 connects the free end of lever 18 with an operating lever 21, which is pivotally secured to the framework of the car and adapted to move the clutch members 6 and 7 into engagement. A spring 22 is connected to the rod 20 and to the framework 2, and is so tensioned that it holds the clutch members apart.

Secured to the side of the chassis is an air pump 23 which is held in place by suitable straps 24. The piston rod 25 extends from the pump and has its front end connected to one end of bell crank lever 26, which is pivoted at 27 to the frame 2. The other end of bell crank lever 26 is connected to the crank 11 by means of a pitman 28. When shaft 10 rotates, piston rod 25 will be reciprocated and the pump 23 operated. By means of a hose (not shown) connected to an outlet 29 the compressed air may be conducted to the tire valve for inflation. The pump is preferably provided with means (not shown) for disconnecting it so that it will not be operated except when it is desired to compress air for any purpose.

Secured to the framework of the car by any suitable system of braces, such as 30, is a gear casing 31 (Figs. 3 and 4) which has rotatably mounted therein a worm gear 32 which cooperatively engages with the worm 33 in such a manner that when the latter is turned the gear 32 will be rotated. One end of worm 33 is provided with a socket 34 having a square opening 35 adapted to receive the squared end of shaft 10.

The other end of the worm 33 has a square end 36 which is adapted to receive a crank or to have mounted thereon a pulley of some kind. When the clutch members 6 and 7 are engaged, and the engine 1 operated, it is evident that shaft 10 will be turned and will rotate the worm 33, which will transmit the motion to the worm gear 32 and shaft 37. I provide shaft 37 with two projecting ends 38 and 39, which are square in cross section and adapted to receive the drum shown in Fig. 5, or any of the pulleys or sprocket wheels illustrated.

If it is desired to use my device as a winch for hoisting heavy objects, the drum 40 shown in Fig. 5 may be applied to either one of ends 38 or 39, and the cable 41 extended to the place where it is to be employed. If it is desired to load material on the truck from the rear end the cable 41 may be run over pulley 42 directly back to the object to be loaded. If the loading is to be done from the side, the rope may be passed over pulley 43 on the end of the swinging arm 44 of the upright post 45, and when it is desired to pull the truck out of the mud, the rope may be fastened to a stake or pin in the ground. If the objects to be raised are light and more speed is required, the drum may be secured to the end 36 in the manner shown in Fig. 2. The belt pulley 46 (Fig. 7) can be secured to end 36 or to either one of ends 38 or 39. For the purpose of hoisting or pulling, it may be desirable to employ a chain cable, and for the purpose of cooperating therewith I have provided a special sprocket wheel 47 (Fig. 8) which is so designed that it will cooperate with the links in the chain.

As the specific manner in which my attachment is secured to the machine is different for different machines, I have merely indicated the securing and bracing members in a general way, and I do not intend to convey the idea that the device shall be installed exactly as in the manner shown, but that such modifications may be made as are necessary.

It is apparent from the above that I have provided an attachment that can be readily installed on trucks and automobiles, and which will enable the operator to perform various useful operations which will be of great assistance in loading and unloading, and which will also enable him to pull the machine out of a mud hole or ditch by means of its own power.

I desire to call attention to the fact that when the winding is done by a drum attached to the ends 38 or 39, the winding drum cannot be rotated by the action of the load, as the screw 33 will hold the wheel 32 against turning, and the load can then be lowered slowly by means of a crank applied to the end 36.

Having now described my invention, what I claim as new is—

1. In combination, a frame, a motor carried by said frame, a bearing member carried thereby, a crank shaft, a clutch member on said crank shaft, a drive shaft journaled in said bearing, a housing secured to said frame, a worm wheel rotatably mounted therein, a shaft provided with a worm for engaging said wheel, a non-circular socket in one end of said shaft adapted to cooperate with a correspondingly shaped end portion of said drive shaft, a clutch member on said drive shaft for cooperating with the clutch member on the crank shaft, and means for moving said clutch members together and of separating them from each other.

2. In combination, a frame, a motor carried by said frame, a bearing member carried thereby, a crank shaft, a clutch member on said crank shaft, a drive shaft journaled in said bearing, a housing secured to said frame, a worm wheel rotatably mounted therein, a shaft provided with a worm for engaging said wheel, a non-circular socket in one end of said shaft adapted to cooperate with a correspondingly shaped end portion of said drive shaft, said drive shaft having a crank portion intermediate its ends, a pitman connected to said crank portion, an air compressor secured to said frame and adapted to be operated by said pitman, a clutch member secured to the inner end of said drive shaft and adapted to cooperate with the clutch member on the crank shaft, and means comprising a pivoted lever for making said clutch operative or inoperative.

3. In combination, a frame, a motor carried by said frame, a bearing member carried thereby, a crank shaft, a clutch member on said crank shaft, a drive shaft journaled in said bearing, a housing secured to said frame, a worm wheel rotatably mounted therein, a shaft provided with a worm for engaging said wheel, a non-circular socket in one end of said shaft adapted to cooperate with a correspondingly shaped end portion of said drive shaft, said drive shaft having a crank portion intermediate its ends, a pitman connected to said crank portion, an air compressor secured to said frame and adapted to be operated by said pitman, a clutch member secured to the inner end of said drive shaft and adapted to cooperate with the clutch member on the crank shaft, the clutch member on the end of the drive shaft having an annular groove, a yoke member cooperating with said groove, a lever having one of its ends connected to the frame, a second lever secured to said frame, a bar connecting said first named lever, and a spring connected to said bar and adapted to keep the clutch in inoperative position.

4. A power attachment adapted to be attached to an automobile and to be operated by the engine thereof, comprising a pair of shafts at right angles to each other, one of which is connected with the engine crank shaft by means of a clutch, and the other of which is operated by a worm gear, said last named shaft having both of its ends exposed and adapted to receive a pulley, and said first named shaft having its ends exposed and adapted to receive a power transmitting medium.

In testimony whereof I affix my signature.

CONRAD MILLER.